United States Patent
Rashkin et al.

(10) Patent No.: US 11,527,942 B2
(45) Date of Patent: Dec. 13, 2022

(54) EXCITATION CONTROL OF DUAL-WOUND MACHINES FOR COUPLING MITIGATION

(71) Applicants: National Technology & Engineering Solutions of Sandia, LLC, Albuquerque, NM (US); Timothy J. McCoy, Grass Lake, MI (US); Norbert H. Doerry, Burke, VA (US)

(72) Inventors: Lee Joshua Rashkin, Albuquerque, NM (US); Jason C. Neely, Albuquerque, NM (US); Timothy J. McCoy, Grass Lake, MI (US); Norbert H. Doerry, Burke, VA (US)

(73) Assignees: National Technology & Engineering Solutions of Sandia, LLC, Albuquerque, NM (US); United States of America as represented by the Secretary of the Navy, Arlington, VA (US)

( * ) Notice: Subject to any disclaimer, the term of this patent is extended or adjusted under 35 U.S.C. 154(b) by 152 days.

(21) Appl. No.: 16/831,117

(22) Filed: Mar. 26, 2020

(65) Prior Publication Data
US 2020/0313518 A1    Oct. 1, 2020

Related U.S. Application Data

(60) Provisional application No. 62/824,875, filed on Mar. 27, 2019.

(51) Int. Cl.
| | | |
|---|---|---|
| *H02K 11/33* | (2016.01) | |
| *H02K 11/26* | (2016.01) | |
| *H02K 11/01* | (2016.01) | |

(52) U.S. Cl.
CPC ............. *H02K 11/33* (2016.01); *H02K 11/01* (2016.01); *H02K 11/26* (2016.01); *H02K 2211/00* (2013.01)

(58) Field of Classification Search
CPC ........ H02K 11/33; H02K 11/26; H02K 11/01; H02P 21/141; H02P 9/302; H02P 9/307; H02P 21/13; H02P 25/22
See application file for complete search history.

(56) References Cited

U.S. PATENT DOCUMENTS

| | | | | |
|---|---|---|---|---|
| 7,388,300 | B2 * | 6/2008 | Anghel | F01D 15/10 |
| | | | | 290/31 |
| 10,773,922 | B2 * | 9/2020 | Jiang | B66B 1/306 |
| 2005/0162030 | A1 * | 7/2005 | Shah | H02K 19/26 |
| | | | | 310/165 |

FOREIGN PATENT DOCUMENTS

JP    2678445 B2  *  11/1997

OTHER PUBLICATIONS

JP-2678445-B2 machine translation on 15/18/22.*
(Continued)

*Primary Examiner* — Leda T Pham
(74) *Attorney, Agent, or Firm* — Kevin W. Bieg

(57) ABSTRACT

A dual-wound machine comprises a dual-wound generator supplying power to two separate powered zones. The generator comprises a wound rotor with a field winding and a stator with two sets of phase windings and a field control loop that controls the excitation voltage applied to the field winding and therefore the magnetic field produced by the rotor, in order to maintain a constant field flux in the generator and mitigate dynamic coupling between the two sets of phase windings when supplying power to unbalanced loads.

3 Claims, 13 Drawing Sheets

(56) References Cited

OTHER PUBLICATIONS

Aghaebrahimi, M. R. and Menzies, R.W. ,"A Transient Model for the Dual Wound Synchronous Machine", Canadian Conference on Electrical and Mechanical Engineering (1997), vol. 2, pp. 862-865.

Doktorcik, C. J., "Modeling and Simulation of a Hybrid Ship Power System" M.S. thesis, Dept. Elect. Eng., Purdue Univ., IN, 2011.

Hodge, C. G. and Eastham J. F. ,"Dual Wound Machines for Electric Ship Power Systems," IEEE Electric Ship Technologies Symposium (ESTS) (2015), pp. 62-67.

Mese, E. et al., "A Permanent Magnet Synchronous Machine with Motor and Generator Functionalities in a Single Stator Core," Conference: Compumag , Jul. 2013.

Mese, E. et al., "Design Considerations for Dual Winding Permanent Magnet Synchronous Machines", IEEE Energy Conversion Congress and Exposition (ECCE) (2012), pp. 1894-1901.

Rashkin, L. J. et al., "Dynamic Considerations of Power System Coupling through Dual-Wound Generators", IEEE Electric Ship Technologies Symposium (ESTS) (2017), pp. 493-500.

\* cited by examiner

EXCITATION CONTROL OF DUAL-WOUND MACHINES FOR COUPLING MITIGATION

CROSS-REFERENCE TO RELATED APPLICATION

This application claims the benefit of U.S. Provisional Application No. 62/824,875, filed Mar. 27, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The invention was also made in the performance of official duties by one or more employees of the Department of the Navy. The Government has certain rights in the invention and the invention herein may be manufactured, used or licensed by or for the Government of the United States of America for governmental purposes without the payment of any royalties thereon or therefor.

FIELD OF THE INVENTION

The present invention relates to control of dual-wound machines and, in particular, to excitation control of dual-wound machines for coupling mitigation.

BACKGROUND OF THE INVENTION

The primary purpose of a dual-wound machine is to supply multiple subsystems from a single compact generator. Several different field winding strategies and applications can be applied to dual-wound machines. See C. G. Hodge and J. F. Eastham, "Dual-wound machines for electric ship power systems," 2015 *IEEE Electric Ship Technologies Symposium (ESTS)*, pp. 62-67, June, 2015; E. Mese et al., "A permanent magnet synchronous machine with motor and generator functionalities in a single stator core," *Compumag* 2013, July, 2013; and E. Mese et al., "Design considerations for dual winding permanent magnet synchronous machines," 2012 *IEEE Energy Conversion Congr. and Expo. (ECCE)*, pp. 1894-1901, September, 2012. This can include using two sets of windings with different frequencies to supply a high-powered propulsion load as well as a lower-powered service load but can also allow for redundant systems where one generator can be used to supply power for both port and starboard busses. See C. G. Hodge and J. F. Eastham, "Dual-wound machines for electric ship power systems," 2015 *IEEE Electric Ship Technologies Symposium (ESTS)*, pp. 62-67, June, 2015; and N. Doerry and J. Amy Jr., "The Road to MVDC," presented at ASNE Intelligent Ships Symposium 2015, Philadelphia, Pa., May 20-21, 2015. Dual-wound machines can also allow for a single machine to operate in both generation and motoring modes at the same time. In some applications, this can allow for some simplification of power electronics and enable a connected battery to charge or discharge to one set of windings while the other set of windings is always used to provide power to electrical devices on the system. See E. Mese et al., "A permanent magnet synchronous machine with motor and generator functionalities in a single stator core," *Compumag* 2013, July, 2013. Dual-wound machines can also provide better power quality by tighter regulation of stator magnetomotive force (MMF). See E. Mese et al., "Design considerations for dual winding permanent magnet synchronous machines," 2012 *IEEE Energy Conversion Congr. and Expo. (ECCE)*, pp. 1894-1901, September, 2012. In all the above cases, the machine windings are made to minimize flux linkages between the phases of different winding sets and their construction can be very different from traditional machines.

SUMMARY OF THE INVENTION

The present invention is a dual-wound machine, comprising a wound-rotor dual-wound generator supplying power to two separate powered zones having unbalanced loads, wherein the generator comprises a wound rotor having a field winding producing a magnetic field, a stator having two sets of phase windings each set supplying power to a separate powered zone, and a field control having a feedback loop that controls the excitation voltage applied to the field winding, and thereby the magnetic field produced by the rotor, to mitigate dynamic coupling between the two sets of phase windings when supplying power to the separate powered zones. The feedback loop can maintain a constant field flux in the generator or adjust the field flux to compensate for dynamic changes. The feedback loop can regulate a field flux in the generator in response to a generator speed.

As an example, a 20 MW dual-wound gas turbine generator (GTG) system was considered for an electric power distribution architecture. Full-scale dynamic models were developed for two stator variations (symmetric and asymmetric) and two rotor variations (permanent magnet and wound rotor). Reduced scale (10 kW) models of the permanent-magnet-based dual-wound machine were developed and validated through hardware experiment. In simulation and in hardware, a dynamic coupling between phase-sets was demonstrated, such that a disturbance of the load on one side of the generator can have a significant effect on the back-emf of the other winding set and consequently on the direct current (DC) bus voltages on the other bus of the system. This coupling was evaluated in both the time domain and frequency domain. In simulations of full-scale systems with the wound rotor dual-wound machine of the present invention, it was shown that the propagation through the machine can be mitigated through active control of the field excitation to maintain a commanded field flux in the generator.

BRIEF DESCRIPTION OF THE DRAWINGS

The detailed description will refer to the following drawings, wherein like elements are referred to by like numbers.

DETAILED DESCRIPTION OF THE INVENTION

The primary engineering challenge with dual-wound machines is managing the inductive and electromechanical coupling of the two circuits. Specifically, since the phase currents of both circuits contribute to flux linkage and torque, the loading of one circuit may couple to the other through the stator flux (electromagnetic induction) and/or through transient effects on mechanical speed which in turn affect back-emf (electromechanical). While the electromechanical coupling is somewhat intuitive and easily modeled, the inductive coupling is more challenging.

As an example of the invention, a two-zone power system with a dual-wound generator was modeled and evaluated in simulation for several fault scenarios. An average-value model was developed to capture the coupling between phases under different loading conditions. In a previous work, a kilowatt-scale system was analyzed that considered the use of a dual-wound permanent magnet machine, two passive rectifiers, and two DC buses with resistive load. See L. J. Rashkin et al., "Dynamic Considerations of Power System Coupling through Dual-Wound Generators," 2017 *IEEE Electric Ship Technologies Symposium (ESTS)*, Washington, D.C., 2017, pp. 493-500. That system demonstrated in simulation and hardware some coupling between load changes on one bus and dc voltage variation in the other bus. Understanding the dynamics of this cross-bus coupling is imperative to the successful implementation of a dual-wound generator system. This invention is directed to a wound-rotor synchronous dual-wound machine that provides a means to actively mitigate cross-bus coupling through feedback controls that use feedback of the system state (i.e. speed, bus voltage, phase current, flux) to control field winding excitation voltage and, therefore, the magnetic field produced by the rotor.

Two-Zone Power System with Dual-Wound Generator

Figure 1:
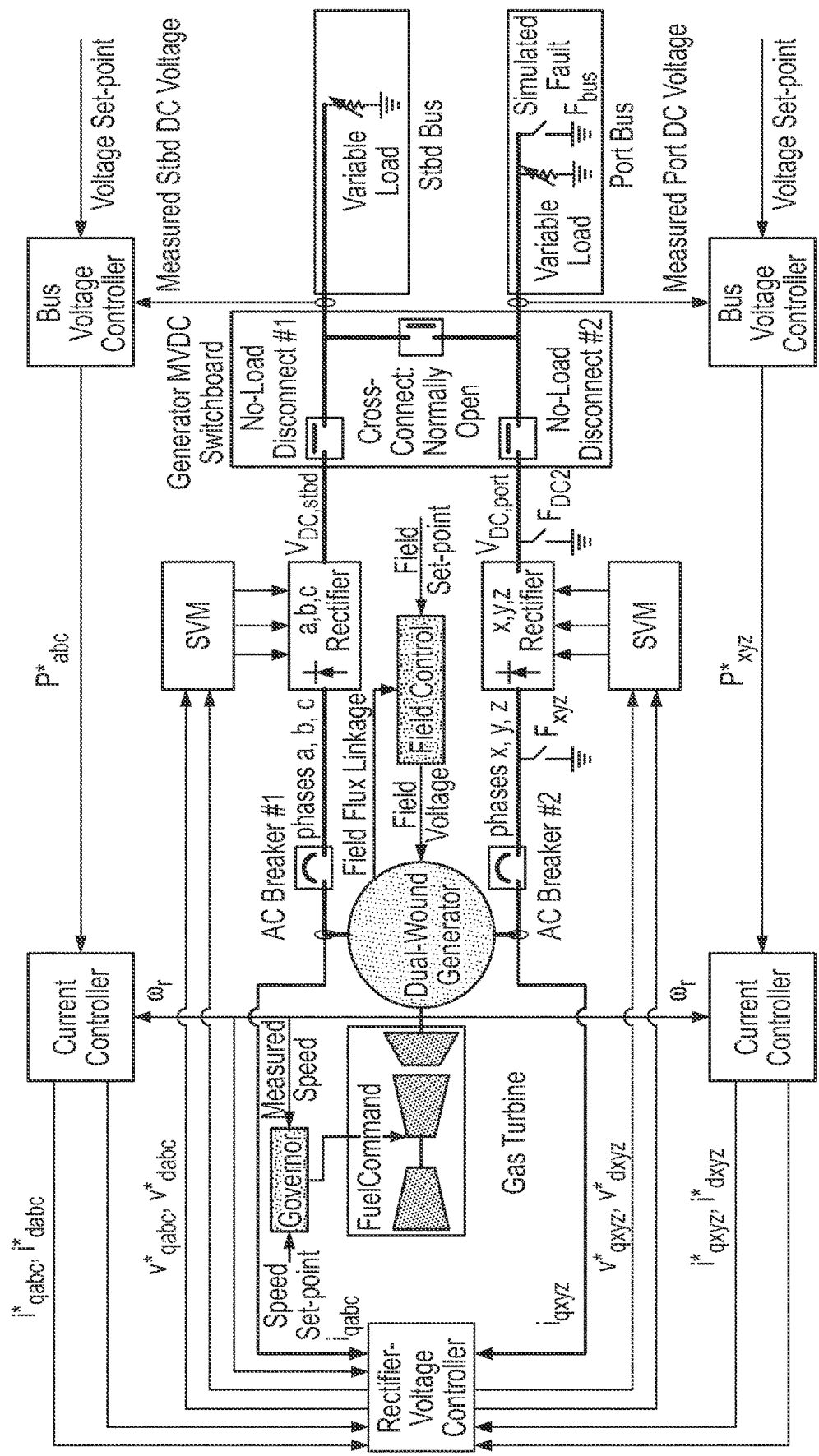
FIG. 1 is an illustration of two powered zones (Stbd and Port) supplied by a single dual-wound generator, showing all control blocks.

The invention is directed to the control of a two-zone power system, wherein both zones are supplied by a single dual-wound generator. A schematic representation of an exemplary system that has been proposed for an all-electric ship is shown in FIG. 1. This system uses a dual-wound generator to power both starboard (Stbd Bus) and port (Port Bus) side buses using different 3-phase sets (abc and xyz) from the same generator. Due to the collocated sets of stator phase windings sharing a common rotor, there are inductive and electromechanical coupling mechanisms between the two sets of phase windings in the generator. This, in effect, couples the port and starboard electrical buses, resulting in the possibility of variable load changes and faults on one bus creating disturbances on the other bus. Thus, the coupling between buses must be managed to ensure the isolation that is required.

The exemplary system includes a 20 MW rated gas-turbine engine with speed governor, a dual-wound generator, two rectifiers with LC output filters, switchboard, and variable resistive loads. Herein, two variations of a dual-wound machine stator are considered, including a symmetrical dual-wound machine (SDW) and an asymmetrical dual-wound machine (ADW). These machines can employ either a rotor mounted with permanent magnets, known as a permanent magnet synchronous machine (PMSM), or a wound rotor with field windings and an excitation system, known as a wound rotor synchronous machine (WRSM). With a wound-rotor generator, a field control can be used to control the field voltage applied to the field winding which in turn controls the magnetic field produced by the rotor. A larger scale system in the 20 MW range is more likely to use a WRSM. In the exemplary system, power is distributed on both buses as a medium voltage direct current (MVDC) voltage. The bus voltages ($V_{DC,stbd}$ and $V_{DC,port}$) are regulated by the active rectifiers (Rectifier abc, and Rectifier xyz). The active rectifier models are based on a space-vector modulation (SVM) scheme. The models are described below.

Gas Turbine Engine

A model for the gas turbine engine was derived from Doktorcik and Meyer, which simplifies the system based on an empirical analysis of power flow. See C. J. Doktorcik, "Modeling and Simulation of a Hybrid Ship Power System" M. S. thesis, Dept. Elect. Eng., Purdue Univ., IN, 2011; and R. T. Meyer et al., "Gas Turbine Engine Behavioral Modeling," School of Elect. Eng., Purdue Univ., West Lafayette, Tech. Rep. TR-ECE-14-01, 2014.

According to the derivation of Doktorcik, the engine model takes the form:

$$P^*_{fuel} = (c_6 + c_7\omega_{rm} + c_8\omega_{rm}^2 + c_9\omega_{rm}^3)u_{fuel} + \quad (1)$$
$$(c_{10} + c_{11}\omega_{rm} + c_{12}\omega_{rm}^2 + c_{13}\omega_{rm}^3)(1 - u_{fuel})$$

$$\frac{dP_{fuel}}{dt} = m_{rate}\tanh\left(\frac{P^*_{fuel} - P_{fuel}}{\tau_{fuel}m_{rate}}\right) \quad (2)$$

$$\frac{dP_{comp}}{dt} = k_5 P_{comp} + k_6 P_{fuel} \quad (3)$$

$$P_{wf3} = \eta_{comb}P_{fuel} + P_{comp} \quad (4)$$

$$P_{turb} = (c_1 + k_1 P_{wf3} + k_2 P_{wf3}^2)\omega_{rm} + (k_3 P_{wf3} + k_4 P_{wf3}^2)\omega_{rm}^2 \quad (5)$$

where $P^*_{fuel}$ and $P_{fuel}$ are the commanded and actual fuel power (rate of chemical energy delivered), $P_{comp}$ and $P_{wf3}$ are the power at the compressor and output shaft, $u_{fuel}$ is the normalized control input between 0 and 1, $m_{rate}$ is the maximum rate of change of fuel power, $\tau_{fuel}$ is the time constant of the fuel rate, and $\eta_{comb}$ is the combustion efficiency.

The parameters $k_1$ through $k_6$ are based on a surface mapping of the relationship between steady-state output power, steady-state fuel power and steady-state speed, and $\tau_{fuel}$ and the efficiencies of the compressor, combustor, turbine, and extraction. The parameters $c_6$ through $c_{13}$ determine polynomial fits to the minimum and maximum fuel power as functions of speed.

The output torque of the turbine, $T_{turb}$, can be determined by dividing the turbine output power by the shaft speed:

$$T_{turb} = \frac{P_{turb}}{\omega_{rm}} \tag{6}$$

The turbine speed is controlled by a standard proportional+ integral (PI) feedback control-based governor. The control adjusts the mass flow rate of fuel in response to turbine speed error.

$$u_{fuel}(t) = K_P(\omega^*_{rm} - \omega_{rm}(t)) + K_I\!\int(\omega^*_{rm} - \omega_{rm}(t))dt \tag{7}$$

where $K_P$ and $K_I$ are the proportional and integral coefficients respectively and are provided in Table 1.

Dual-Wound Generator

Figure 13:
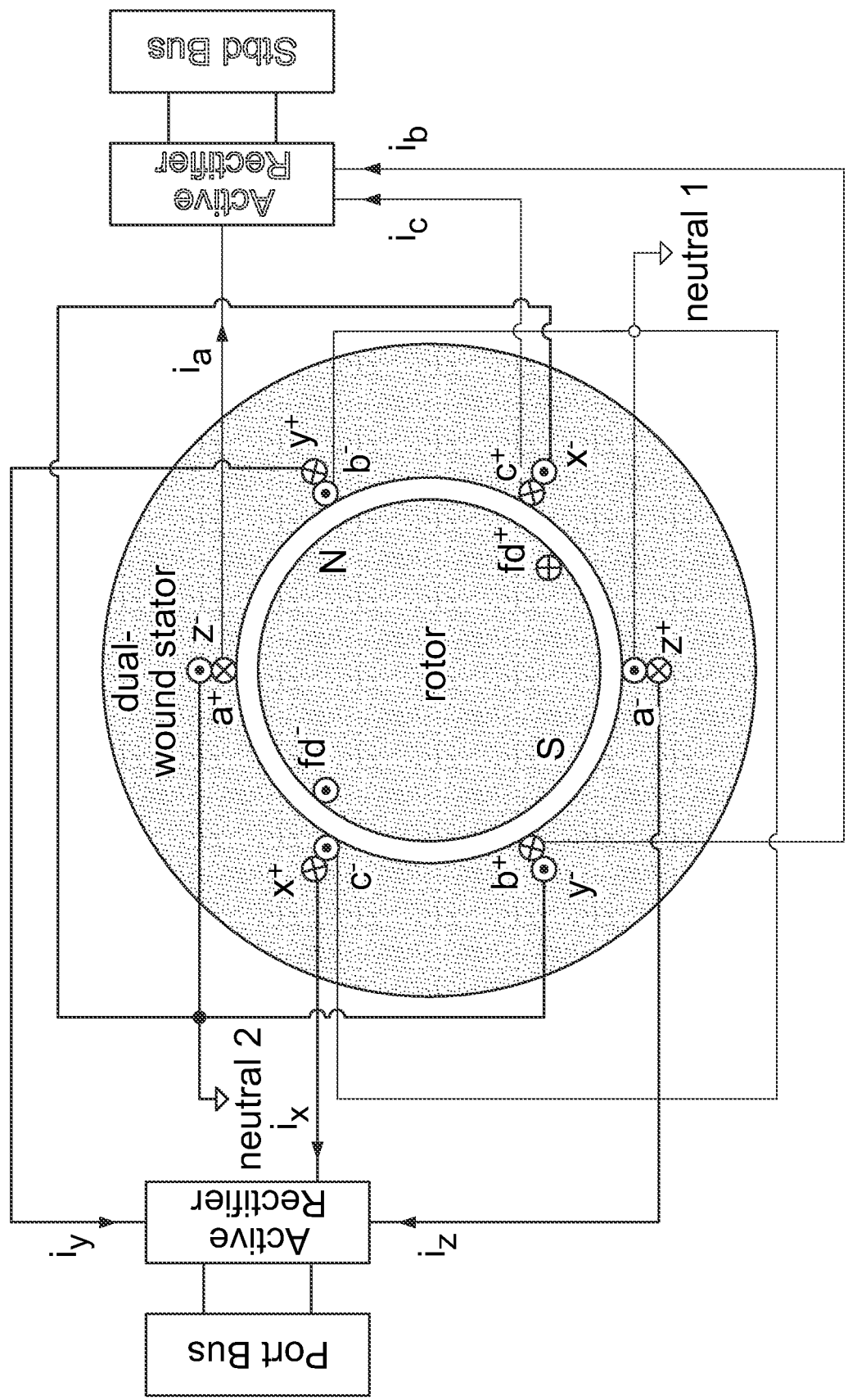
FIG. 13 is an end view schematic illustration of dual-wound generator comprising a stator having two sets of collocated phase windings sharing a common rotor having a field winding.

FIG. 13 illustrates a dual-wound generator comprising two collocated sets of stator phase windings sharing a common rotor. The generator comprises a wound rotor having a field winding (fd+,fd−) producing a magnetic field (N, S) and a stator having two sets of collocated phase windings (a+,a−; b+,b−; c+,c− and x+,x−; y+,y−; and z+,z−) each set supplying power ($i_a$, $i_b$, $i_c$; and $i_x$, $i_y$, $i_z$; respectively) to a separate powered zone (Stbd and Port).

For a round rotor permanent magnet machine with 6 phases, a reference frame transformation can be constructed by considering the two 3-phase sets separately, with one referenced to the rotor position $\theta_r$ and one offset by an angle $\beta$ as follows:

$$K^r_{s_{abc}} = \frac{2}{3}\begin{bmatrix} \cos(\theta_r) & \cos\!\left(\theta_r - \frac{2\pi}{3}\right) & \cos\!\left(\theta_r + \frac{2\pi}{3}\right) \\ \sin(\theta_r) & \sin\!\left(\theta_r - \frac{2\pi}{3}\right) & \sin\!\left(\theta_r + \frac{2\pi}{3}\right) \\ \frac{1}{2} & \frac{1}{2} & \frac{1}{2} \end{bmatrix} \tag{8}$$

$$K^r_{s_{xyz}} = \frac{2}{3}\begin{bmatrix} \cos(\theta_r - \beta) & \cos\!\left(\theta_r - \beta - \frac{2\pi}{3}\right) & \cos\!\left(\theta_r - \beta + \frac{2\pi}{3}\right) \\ \sin(\theta_r - \beta) & \sin\!\left(\theta_r - \beta - \frac{2\pi}{3}\right) & \sin\!\left(\theta_r - \beta + \frac{2\pi}{3}\right) \\ \frac{1}{2} & \frac{1}{2} & \frac{1}{2} \end{bmatrix} \tag{9}$$

$$K^r_s = \begin{bmatrix} K^r_{s_{abc}} & 0 \\ 0 & K^r_{s_{xyz}} \end{bmatrix} \tag{10}$$

where $\beta$ denotes the pitch angle between the abc- and xyz-set of stator phase windings. The generator model is adjustable to run with offsets of 60° or 30° between the abc- and xyz-phases of the generator, termed symmetrical and asymmetrical respectively. The machine equations in this reference frame can be written as:

$$v_{qs_{abc}}{}^r = r_s i_{qs_{abc}}{}^r + \omega_r \lambda_{ds_{abc}}{}^r + p\lambda_{qs_{abc}}{}^r \tag{11}$$

$$v_{qs_{xyz}}{}^r = r_s i_{qs_{xyz}}{}^r + \omega_r \lambda_{ds_{xyz}}{}^r + p\lambda_{qs_{xyz}}{}^r \tag{12}$$

$$v_{ds_{abc}}{}^r = r_s i_{ds_{abc}}{}^r - \omega_r \lambda_{qs_{abc}}{}^r + p\lambda_{ds_{abc}}{}^r \tag{13}$$

$$v_{ds_{xyz}}{}^r = r_s i_{ds_{xyz}}{}^r - \omega_r \lambda_{qs_{xyz}}{}^r + p\lambda_{ds_{xyz}}{}^r \tag{14}$$

$$v_{0s_{abc}}{}^s = r_s i_{0s_{abc}}{}^r + p\lambda_{0s_{abc}}{}^r \tag{15}$$

$$v_{0s_{xyz}}{}^s = r_s i_{0s_{xyz}}{}^r + p\lambda_{0s_{xyz}}{}^r \tag{16}$$

$$\lambda_{qs_{abc}}{}^r = (L_{ls} + \tfrac{3}{2}L_{ms})i_{qs_{abc}}{}^r + \tfrac{3}{2}L_{ms}i_{qs_{xyz}}{}^r \tag{17}$$

$$\lambda_{qs_{xyz}}{}^r = (L_{ls} + \tfrac{3}{2}L_{ms})i_{qs_{xyz}}{}^r + \tfrac{3}{2}L_{ms}i_{qs_{abc}}{}^r \tag{18}$$

$$\lambda_{ds_{abc}}{}^r = (L_{ls} + \tfrac{3}{2}L_{ms})i_{ds_{abc}}{}^r + \tfrac{3}{2}L_{ms}i_{ds_{xyz}}{}^r + \lambda'_m \tag{19}$$

$$\lambda_{ds_{xyz}}{}^r = (L_{ls} + \tfrac{3}{2}L_{ms})i_{ds_{xyz}}{}^r + \tfrac{3}{2}L_{ms}i_{ds_{abc}}{}^r + \lambda'_m \tag{20}$$

$$\lambda_{0s_{abc}}{}^r = L_{ls} i_{0s_{abc}}{}^r \tag{21}$$

$$\lambda_{0s_{xyz}}{}^r = L_{ls} i_{0s_{xyz}}{}^r \tag{22}$$

where $f_{qs_{abc}}$, $f_{ds_{abc}}$, and $f_{0s_{abc}}$ denote the variable f from the abc set of phases in the qd0-axis and $f_{qs_{xyz}}$, $f_{ds_{xyz}}$, and $f_{0s_{xyz}}$ denote the variable f from the xyz set of phases in the qd0-axis where f can be any three phase variable such as v, i, or $\lambda$. See P. C. Krause et al., *Analysis of Electric Machinery and Drive Systems*, 2nd ed. Hoboken: John Wiley & Sons, Inc.

The electromagnetic torque may be expressed in the qd-axis as:

$$T_{elec} = \frac{3}{2}\frac{P}{2}\lambda'_m\!\left(i^r_{qs_{abc}} + i^r_{qs_{xyz}}\right) \tag{23}$$

wherein P is the number of poles, $i_{qs_{abc}}{}^r$ is the q-axis current associated with the abc set of phases, $i_{qs_{xyz}}{}^r$ is the q-axis current associated with the xyz set of phases, and $\lambda'_m$ is the flux linkage contributed by the permanent magnet. See P. C. Krause et al., *Analysis of Electric Machinery and Drive Systems*, 2nd ed. Hoboken: John Wiley & Sons, Inc; and M. R. Aghaebramhimi and R. W. Menzies, "A Transient Model for the Dual-wound Synchronous Machine," *Canadian Conference on Elect. and Comput. Eng.* 1997, vol. 2, pp. 862-865, 1997.

For the full 20 MVA system, the generator used scaled parameter values found in Krause. See P. C. Krause et al., *Analysis of Electric Machinery and Drive Systems*, 2nd ed. Hoboken: John Wiley & Sons, Inc. These values were selected to be consistent with realized machines.

Control Blocks

The active rectifiers use a voltage control methodology designed to control the bus voltages of the system. Specifically, on each circuit, the bus voltage control uses a PI control to specify a power command:

$$i^*_{out,abc} = i_{dc_{abc}} + \left(K_{pv} + \frac{K_{iv}}{s}\right)\!\left(v^*_{dc} - v_{dc_{abc}}\right) \tag{24}$$

$$i^*_{out,xyz} = i_{dc_{xyz}} + \left(K_{pv} + \frac{K_{iv}}{s}\right)\!\left(v^*_{dc} - v_{dc_{xyz}}\right) \tag{25}$$

$$P^*_{abc} = v^*_{dc} i^*_{out,abc} \tag{26}$$

$$P^*_{xyz} = v^*_{dc} i^*_{out,xyz} \tag{27}$$

where $i_{dc_{abc}}$ and $i_{dc_{xyz}}$ are the instantaneous load currents on the dc bus, $v_{dc_{abc}}$ and $v_{dc_{xyz}}$ are the measured DC voltages on the dc bus, $v^*_{dc}$ is the commanded bus voltage set-point, and $K_{pv}$ and $K_{iv}$ are the proportional and integral constants of the bus voltage controller. Equations (28) through (31) are used to determine the necessary rectifier currents:

$$i^*_{d_{abc}} = \frac{2P^*_{abc}e_{d_{abc}}}{3(e^2_{q_{abc}} + e^2_{d_{abc}})} \quad (28)$$

$$i^*_{d_{xyz}} = \frac{2P^*_{xyz}e_{d_{xyz}}}{3(e^2_{q_{xyz}} + e^2_{d_{xyz}})} \quad (29)$$

$$i^*_{d_{abc}} = \frac{2P^*_{abc}e_{q_{abc}}}{3(e^2_{q_{abc}} + e^2_{d_{abc}})} \quad (30)$$

$$i^*_{d_{xyz}} = \frac{2P^*_{xyz}e_{d_{xyz}}}{3(e^2_{q_{xyz}} + e^2_{d_{xyz}})} \quad (31)$$

where $e_{d_{abc}}$, $e_{d_{xyz}}$, $e_{q_{abc}}$, and $e_{q_{xyz}}$ are the back emfs produced by the generator. These values can be found with the equations:

$$e_{q_{abc}} = \omega_r \lambda_{ds_{abc}} \quad (32)$$

$$e_{q_{xyz}} = \omega_r \lambda_{ds_{xyz}} \quad (33)$$

$$e_{d_{abc}} = -\omega_r \lambda_{qs_{abc}} \quad (34)$$

$$e_{d_{xyz}} = -\omega_r \lambda_{qs_{xyz}} \quad (35)$$

Finally, the commanded qd-axis rectifier voltages are found with another PI control (inner loop)

$$v^*_{q_{abc}} = e_{q_{abc}} + \left(K_{pr} + \frac{K_{ir}}{s}\right)(i^*_{q_{abc}} - i_{q_{abc}}) \quad (36)$$

$$v^*_{d_{abc}} = e_{d_{abc}} + \left(K_{pr} + \frac{K_{ir}}{s}\right)(i^*_{d_{abc}} - i_{d_{abc}}) \quad (37)$$

$$v^*_{q_{xyz}} = e_{q_{xyz}} + \left(K_{pr} + \frac{K_{ir}}{s}\right)(i^*_{q_{xyz}} - i_{q_{xyz}}) \quad (38)$$

$$v^*_{d_{xyz}} = e_{d_{xyz}} + \left(K_{pr} + \frac{K_{ir}}{s}\right)(i^*_{d_{xyz}} - i_{d_{xyz}}) \quad (39)$$

where $K_{pr}$ and $K_{ir}$ are the proportional and integral constants for the rectifier voltage controller.

In the case of the WRSM, a field control of the excitation voltage applied to the field winding is also required. A standard voltage regulator is not an ideal solution in this case because there are two voltages that would need to be regulated by a single field winding which would result in another coupling mechanism between the two sides. Instead bus voltages can be maintained by the active rectifiers and the voltage to field winding can be controlled to maintain a constant flux linkage $$v_{fd} = v^*_{fd} + \left(K_{pl} + \frac{K_{il}}{s}\right)(\lambda^*_{fd} - \lambda'_{fd}) \quad (40)$$

where $v^*_{fd}$ is the initial field winding voltage, $\lambda'^*_{fd}$ is the commanded field winding flux linkage, and $K_{pl}$ and $K_{il}$ are the proportional and integral constants of the field controller. By controlling the voltage applied to the field winding, and thereby controlling the magnetic field produced by the rotor, the effects of the stator phase windings on each other can be minimized when supplying unbalanced loads.

Figure 2:
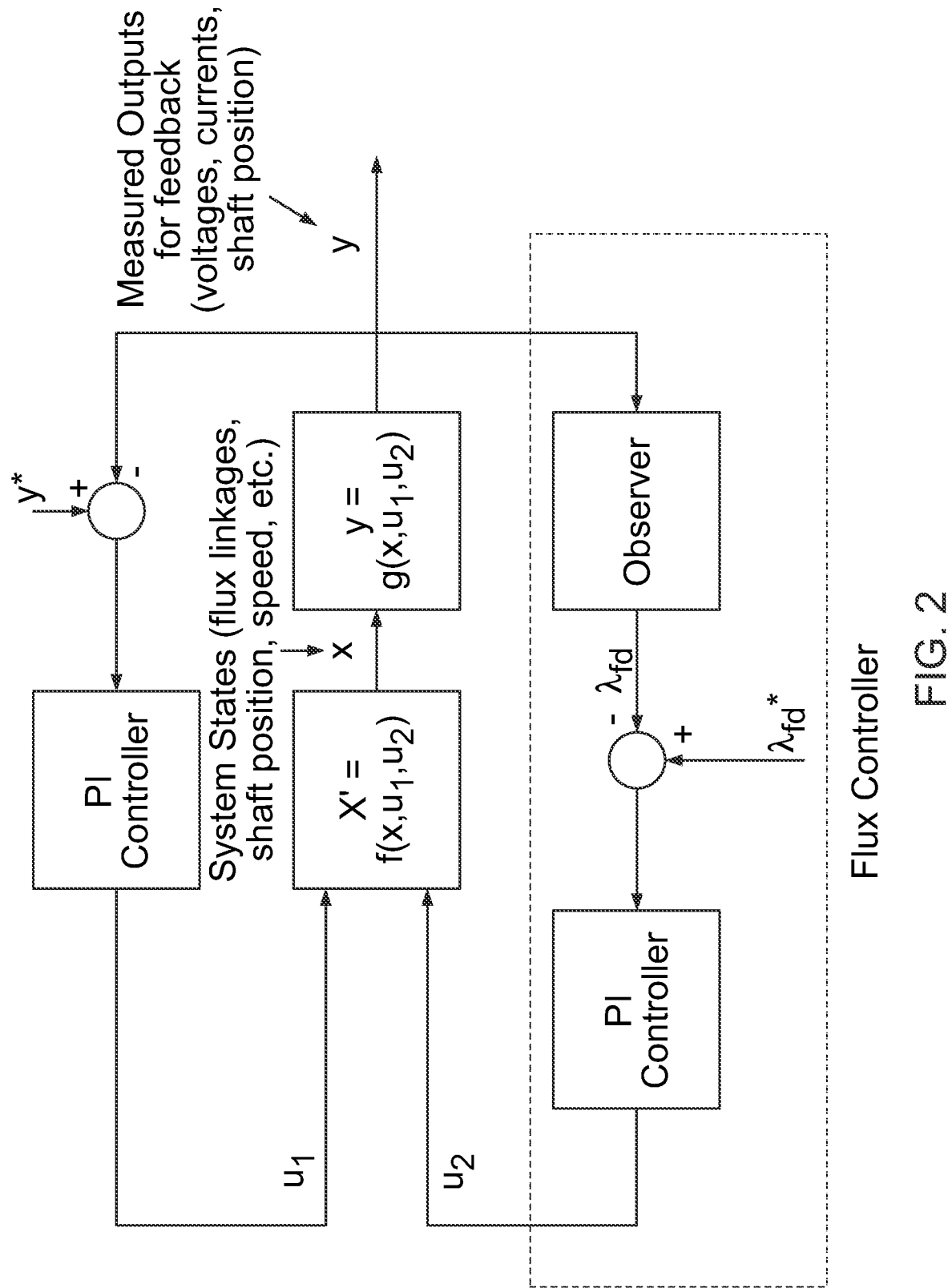
FIG. 2 is a block diagram of the field control system.

FIG. 2 shows the control block diagram for the field control including the flux control system. The system plant dynamics are defined as $x' = f(x, u_1, u_2)$ where x is the system state, x' is the time rate of change of x, $u_1$ is a system input that includes quantities such as the commanded power or speed of the system, and $u_2$ is a system input that includes the field winding voltage or current command. Measured outputs are computed by $y = g(x, u_1, u_2)$. Select quantities in y are regulated by $u_1$ using a feedback control such as a proportional plus integral (PI) control. The field winding excitation voltage is regulated by the flux controller which regulates field flux $\lambda_{fd}$, driving it to the commanded value $\lambda^*_{fd}$, through modulation of input $u_2$ also using feedback control. Since the field flux is not measured directly, a flux observer is implemented to produce an estimated quantity using output y feedback, and providing estimated $\lambda_{fd}$ to the feedback control.

Active Rectifier Model

For the full-scale system, an active rectifier based on space-vector modulation (SVM) was implemented. See P. C. Krause et al., *Analysis of Electric Machinery and Drive Systems*, 2nd ed. Hoboken: John Wiley & Sons, Inc. In the SVM scheme, first the commanded qd-axis voltages are determined by a closed loop control. The system is then transformed into the stationary reference frame and the q- and d-axis modulation indices, $m_q^{s*}$ and $m_d^{s*}$, are calculated $$m_q^{s*} = \frac{v_q^{s*}}{v_{dc}} \quad (41)$$

$$m_d^{s*} = \frac{v_d^{s*}}{v_{dc}} \quad (42)$$

Figure 3:
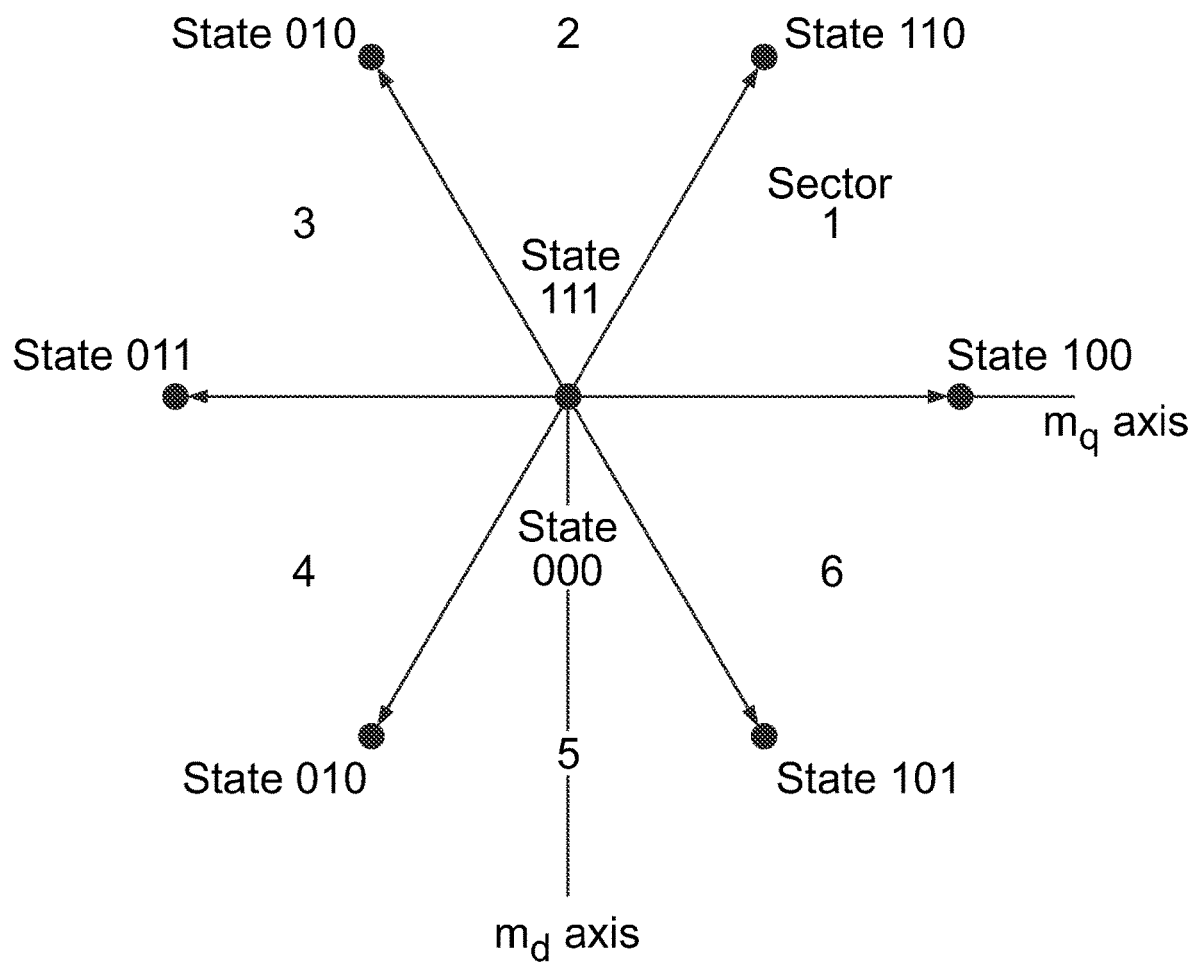
FIG. 3 is a space-vector state diagram for space-vector modulation (SVM). See P. C. Krause et al., *Analysis of Electric Machinery and Drive Systems,* 2nd ed. Hoboken: John Wiley & Sons, Inc.

The modulation indices can be represented as a vector in the state diagram shown in FIG. 3 and will fall into one of six sectors. Each vector in this diagram is denoted in the form abc where each digit represents the state of the corresponding phase leg, where 1 represents the upper switch of a phase being on and a 0 represents the lower switch of a phase being on. Each sector consists of four switching states which includes the two zero states 000 and 111 (e.g., Sector 1 consists of switching states 110, 100, 000, and 111). Any vector lying in a sector can be determined as a weighted sum of the four vectors comprising that sector.

This can be realized by spending a determined amount of time at each operational state represented by these vectors. This allows for the fast average over the switching period to match the desired operation. This procedure is done for each rectifier separately, however some coordination can be achieved in the timing of each rectifier. This allows for operation where only one phase leg of the whole system is changed at a time.

Simulation Model

Figure 4:
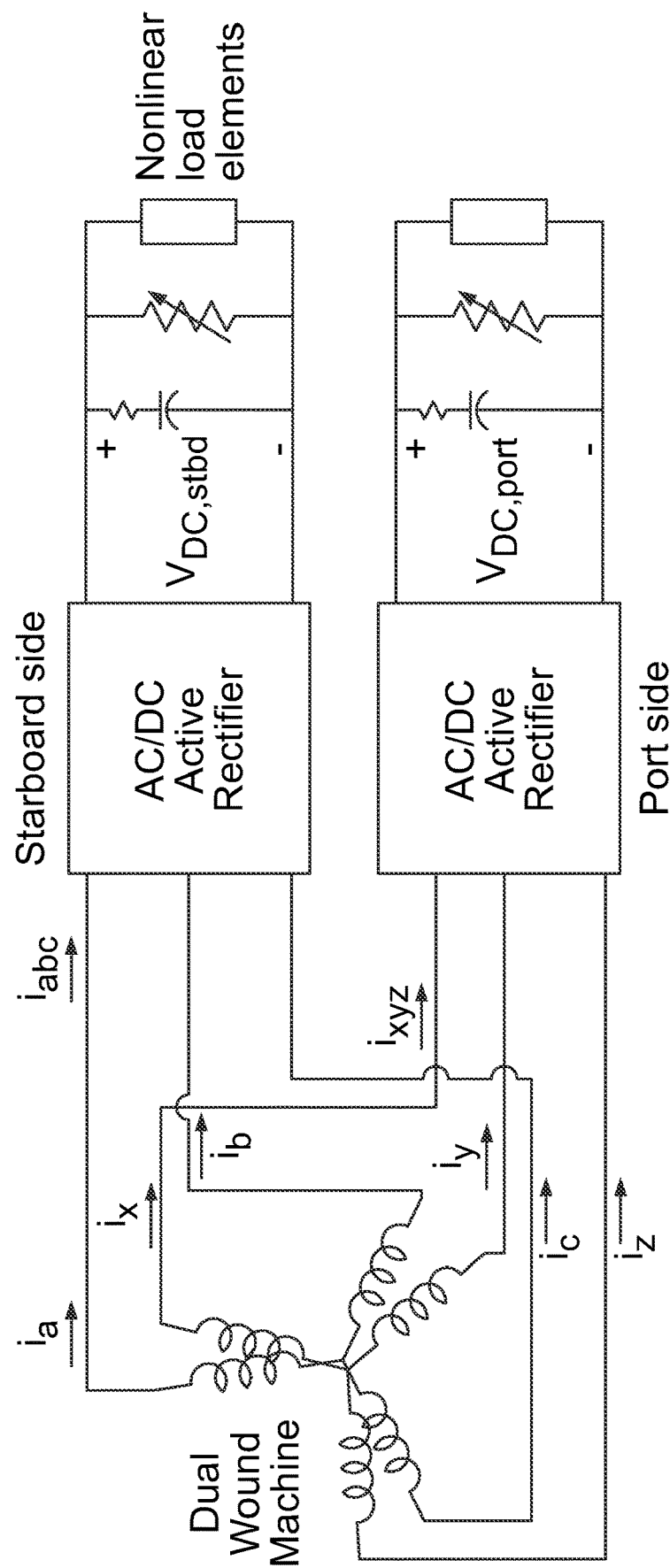
FIG. 4 is an electrical schematic of the dual-wound generator and AC/DC active rectifiers, LC filters, and loads for each zone.
Figure 5:
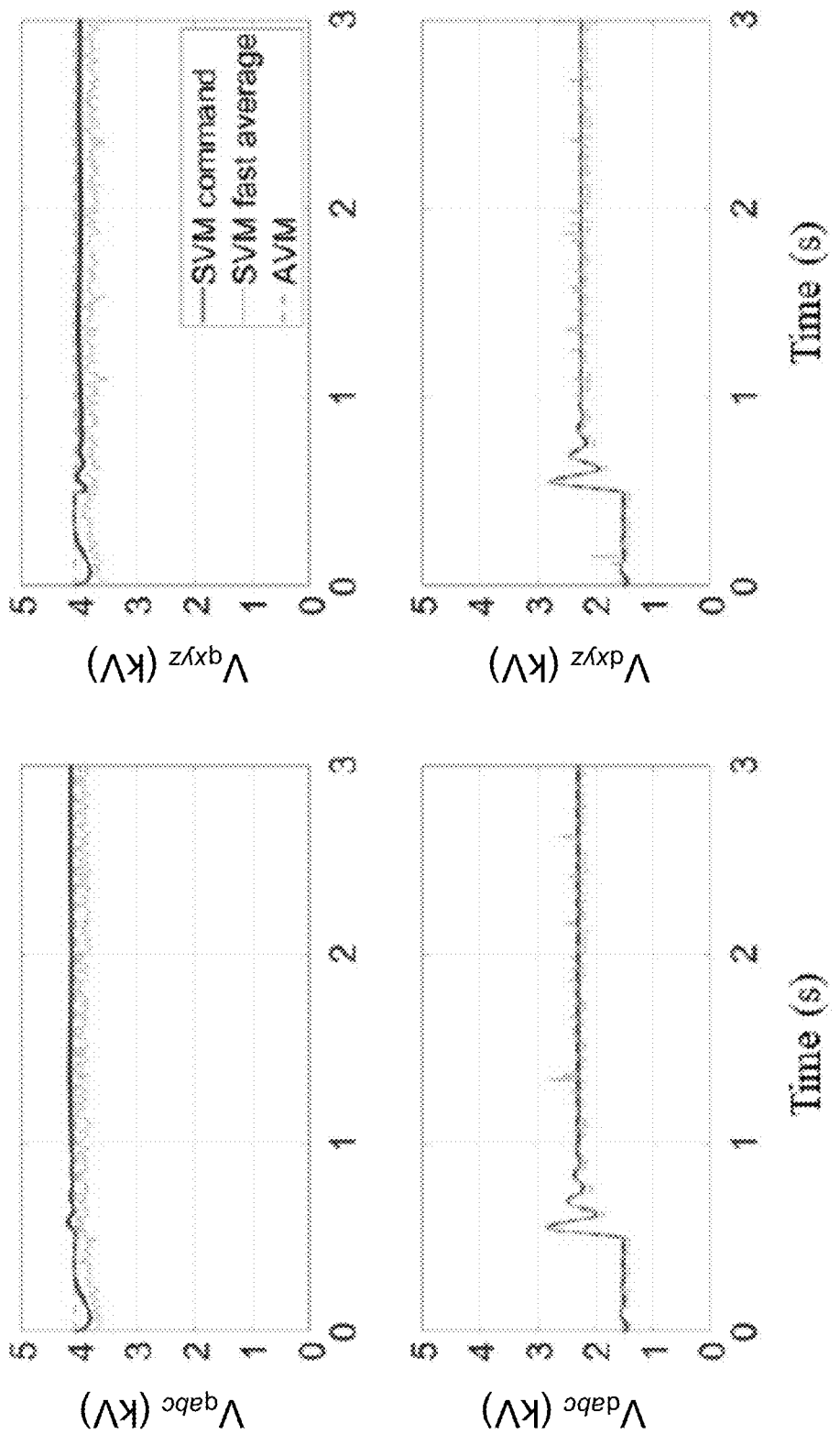
FIG. 5 are graphs comparing the voltage responses of the detailed switch model (SVM) and the average-value model (AVM) to a step change in load on the abc-side of the generator.

To evaluate the dynamics, simulation models were generated in MATLAB™ that include the dual-wound generator as well as the gas turbine prime mover, a passive diode rectifier with LC output filter, and a step-wise resistive load. The gas turbine engine was incorporated into the simulation using the empirically derived model found in Doktorcik, as described above. The machine model was implemented using a MATLAB™ ordinary differential equation (ODE) solver for equations 11-22. The rectifier was modeled both as a detailed switch model (SVM) and as an average-value model (AVM) that uses the commanded qd-voltages to directly determine the actual voltages. A more detailed schematic is shown in FIG. 4. Table 1 provides values used in the model. For the sake of brevity, values for the GE LM 2500 gas turbine parameters $c_1$-$c_{13}$ and $k_1$-$k_6$ are not listed here but were obtained from Doktorcik. See C. J. Doktorcik, "Modeling and Simulation of a Hybrid Ship Power System" M. S. thesis, Dept. Elect. Eng., Purdue Univ., IN, 2011. FIG. 5 shows a comparison between the voltage responses of the SVM and the AVM to a step change in load on the abc-side of the generator. The AVM remains a close match even on the unchanged side (xyz-side) of the generator.

Primary components include: several PMSM generators in the range 6.5 to 10.0 kW, several 5-kW rated energy storage emulators, commercial motor drives with custom controls to emulate different rotational generators, high-power digital resistors capable of load values between 0 and 6.7 kW, and other components. In addition, a master control console scripts the experiments with designated source and load

TABLE 1

System parameters.

| Parameter | Symbol | Value (PMSM) | Value (WRSM) | Units |
|---|---|---|---|---|
| Governer Integral Coeff. | $K_I$ | 0.21331 | 0.21331 | W/rad |
| Governer Proportional Coeff. | $K_P$ | 0.09954 | 0.09954 | W-sec/rad |
| Bus Voltage Controller Inegral Coeff. | $K_{IV}$ | 0.00500 | 0.00500 | A-sec/V |
| Bus Voltage Controller Proportional Coeff. | $K_{PV}$ | 0.0100 | 0.0100 | A/V |
| Rectifier Controller Integral Coeff. | $K_{IR}$ | 11.4572 | 11.4572 | V-sec/A |
| Rectifier Controller Proportional Coeff. | $K_{PR}$ | 2.3844 | 2.3844 | V/A |
| Field Controller Integral Coeff. | $K_{IL}$ | — | 100 | V-sec/(Wb-t) |
| Field Controller Proportional Coeff. | $K_{PL}$ | — | 17.5307 | V/(Wb-t) |
| GTG rotor inertia | J | 359.9403 | 359.9403 | kg-m$^2$ |
| Machine phase resistance | $r_s$ | 0.0216 | 0.0216 | Ω |
| Machine leakage inductance | $L_{ls}$ | 0.0036 | 0.0036 | H |
| Machine magnetizing Inductance | $L_{ms}$ | 0.0307 | 0.0307 | H |
| Machine Speed | $\omega_{rm}$ | 3600 | 3600 | RPM |
| Phase inductance | $L_{mq} = L_{md}$ | 0.01931 | 0.01931 | H |
| Permanent Magnet Flux Linkage | $\lambda_m'$ | 28.4909 | — | A × turn |
| Field Winding Leakage | $L_{lfd}'$ | — | 0.001801 | H |
| Field Winding resistance | $r_{fd}'$ | — | 0.004467 | Ω |
| d-axis damper winding leakage | $L_{lkd}'$ | — | 0.0010344 | H |
| d-axis damper winding resistance | $r_{kd}'$ | — | 0.0640331 | Ω |
| q1-axis damper winding leakage | $L_{lkq1}'$ | — | 0.0103453 | H |
| q1-axis damper winding resistance | r | — | 0.0085378 | Ω |
| q2-axis damper winding leakage | $L_{lkq2}'$ | — | 0.0011956 | H |
| q2-axis damper winding resistance | $r_{kq2}'$ | — | 0.0403764 | Ω |
| Rectifier LC filter inductance | L | 0.008 | 0.008 | H |
| Rectifier LC filter inductor ESR | $r_L$ | 0.22 | 0.22 | Ω |
| Rectifier LC filter capacitance | C | 0.001 | 0.001 | F |
| Rectifier LC filter damping capacitance | $C_d$ | 0.007 | 0.007 | F |
| Rectifier LC filter damping resistance | $r_d$ | 0.86 | 0.86 | Ω |
| Poles | P | 2 | 2 | — |

Laboratory Scale Electric Ship Representation

The dynamic response was evaluated in hardware using a Secure Scalable Microgrid Test Bed (SSMTB). The testbed components used for the dual-wound generator experiment and the hardware results are described below.

Microgrid Testbed Description

The SSMTB was developed to validate controls for networked microgrids and was later configured to represent an all-electric ship power system with multiple busses (or zones). See S. F. Glover et al., "Secure Scalable Microgrid Test Bed at Sandia National Laboratories," *IEEE Cyber-2012 Conference*, Bangkok, Thailand, May 27-31, 2012; D. Wilson et al., "Hamiltonian Control Design for DC Microgrids with Stochastic Sources and Loads with Applications," *International Symposium on Power Electronics, Electrical Drives, Automation and Motion (SPEEDAM)*, Ischia, Italy, Jun. 18-20, 2014; and J. C. Neely et al., "Evaluation of Power Flow Control for an All-Electric Warship Power System with Pulsed Load Applications," *Applied Power Electronics Conference and Exposition (APEC)* 2016, Long Beach, Calif., Mar. 20-24, 2016. The testbed includes three microgrid systems, a central bus cabinet for connecting components and microgrids, control computers, a data acquisition system, and a graphical user interface. The testbed is designed to operate at voltages up to 400 V dc.

profiles to ensure that experiments with highly variable sources and loads are run exactly the same each time.

The SSMTB's electromechanical emulator was modified to mimic the dynamics of a GTG with governor. See J. C. Neely et al., "An economical diesel engine emulator for micro-grid research," *International Symposium on Power Electronics, Electrical Drives, Automation and Motion (SPEEDAM)*, Sorrento, Italy, Jun. 20-22, 2012; J. C. Neely et al., "Wind turbine emulation for intelligent microgrid development," *IEEE Cyber-2012 Conference*, Bangkok, Thailand, May 27-31, 2012; and J. C. Neely et al., "Electromechanical Emulation of Hydrokinetic Generators for Renewable Energy Research," *IEEE OCEANS 2013 Conference*, San Diego, Calif., Sep. 23-26, 2013. The GTG model matches closely the one developed by Doktorcik, albeit scaled down to 10 kW as described in Rashkin. See L. J. Rashkin et al., "Dynamic Considerations of Power System Coupling through Dual-Wound Generators," *2017 IEEE Electric Ship Technologies Symposium (ESTS)*, Washington, D.C., 2017, pp. 493-500; and C. J. Doktorcik, "Modeling and Simulation of a Hybrid Ship Power System" M. S. thesis, Dept. Elect. Eng., Purdue Univ., IN, 2011. Two custom 10 kW rated Georator Corporation generators were developed, installed, and configured to act as a SDW-PMSM and an ADW-PMSM.

Frequency Domain Testing

Simulation studies were done to characterize the interaction between buses in the frequency domain, with the primary focus being on voltage and current disturbances in response to load power changes. This is often done using sine-sweep (or chirp) signals and is represented using transfer function matrices:

$$\begin{bmatrix} Y_1 \\ Y_2 \end{bmatrix} = \begin{bmatrix} H_{11} & H_{12} \\ H_{21} & H_{22} \end{bmatrix} \begin{bmatrix} U_1 \\ U_2 \end{bmatrix} \qquad (43)$$

wherein $H_{ij}$ defines the linear system transfer function matrix relating input vector $U_j$ to output vector $Y_i$. $H_{ij}$ can be found or approximated by sweeping $u_j(t)$ through the frequency range of interest and observing the response in $y_i(t)$, called "sine sweep" or "chirping". $Y_i$ can be a vector of several quantities. Since the derivation is empirical rather than analytic, it does not matter that different quantities (i.e., AC, DC, or even speed) are included in one vector. Herein, the quantities of interest include the following $$Y_i = [V_{qs,i}\ V_{ds,i}\ I_{qs,i}\ I_{ds,i}\ V_{DC,i}]^T \qquad (44)$$

which includes qd-axis voltages and currents as well as the DC voltage.

To evaluate the transfer function matrix in hardware and simulation, a log-sine chirp load was applied to the non-linear load elements on the starboard DC bus shown in FIG. 4. The voltages on both buses, $V_{DC,stbd}$ and $V_{DC,port}$, were measured as the output variables. The time domain results were then used to find the transfer functions between input power and the two voltages. First, $U_j$ and $Y_i$ are attained from $u_j(t)$ and $y_i(t)$ using the MATLAB™ fft( ) function, then H is computed by dividing through each fft element. In hardware, a PMSM generator connected to passive rectifiers was analyzed. In simulation, the analysis was performed both with the PMSM generator and with a WRSM generator connected to active rectifiers. The results of this analysis are described below.

Scaled Hardware Results

Figure 6:
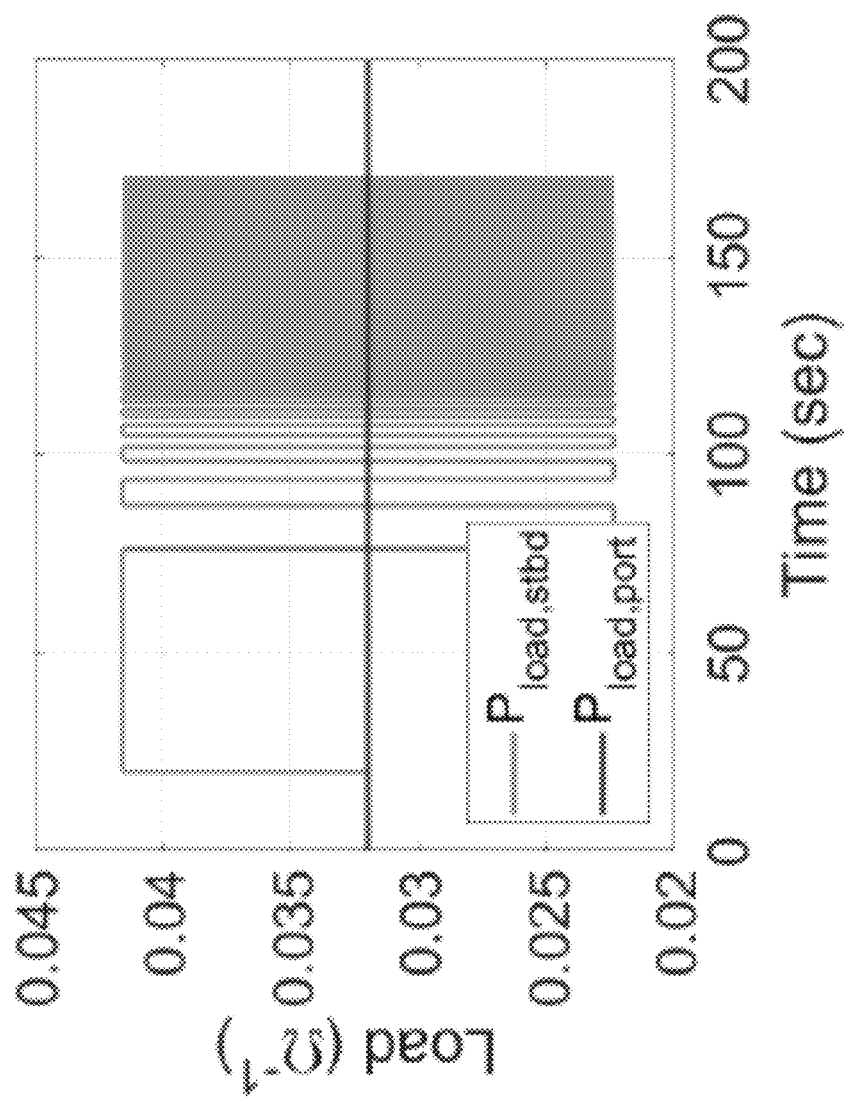
FIG. 6 is a graph of hardware admittance load profiles for chirp testing.
Figure 7:
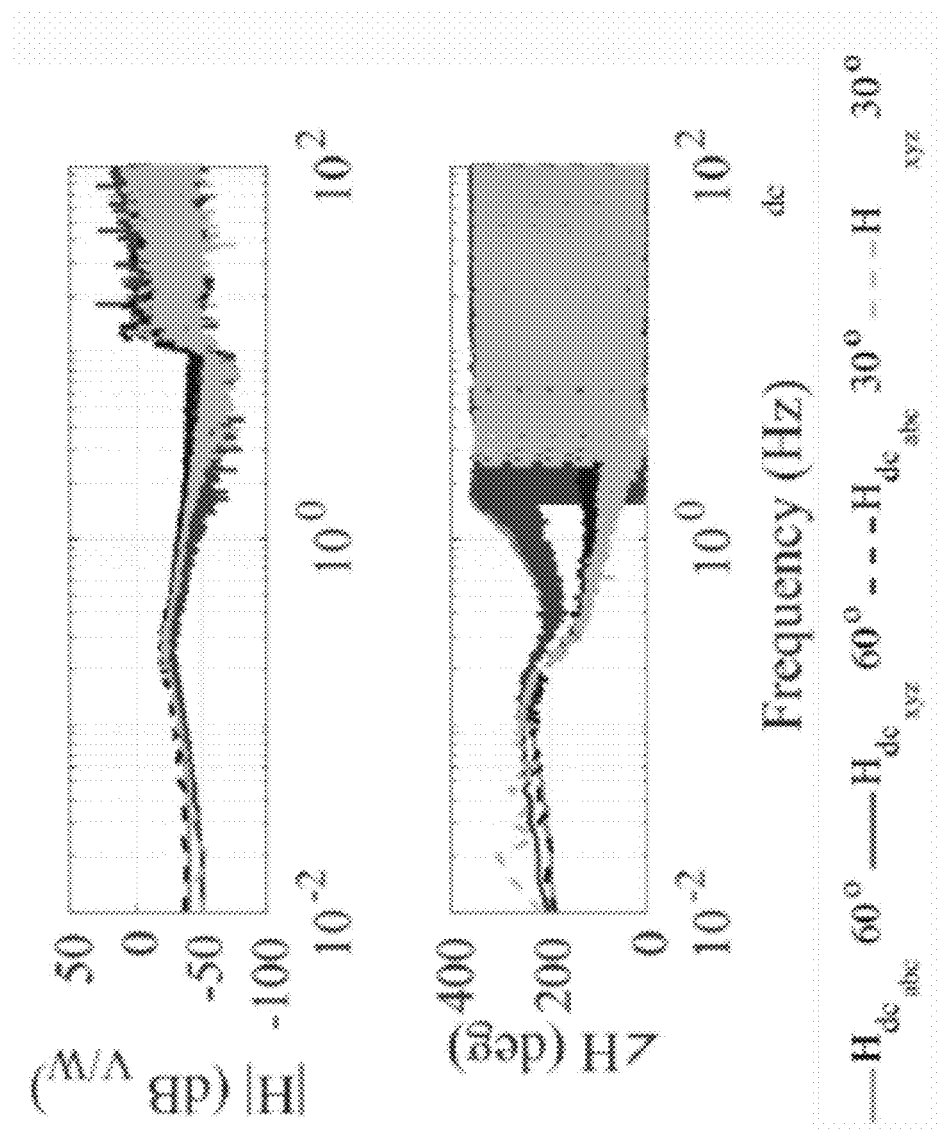
FIG. 7 shows graphs of scaled 10 kW system DC bus voltage responses to chirp on starboard load.

For the testbed hardware, a square wave chirp that ranged from 0.1 Hz to 10 Hz over 150 seconds was applied to the starboard (stbd) side of the system, as shown in FIG. 6. The results of testing the hardware system are shown in FIG. 7. As shown in the graphs there are very few differences in the transfer functions between the frequency behavior of the 30° and 60° systems at low frequencies. The systems start to diverge in phase at frequencies above approximately 0.2 Hz. This shows that the propagation of signals through the machine is independent of the layout of the windings. Additionally, there is very little difference between the effect on the voltage on the opposite side (xyz) of the disturbance and on the side (abc) of the disturbance. While there is some attenuation of the signal on both sides, the disturbance affects both sides of the machine approximately equally. Additionally, there is very little difference on the behavior of the DC bus between a 30° and a 60° offset between phases.

Simulated Full System Results

Figure 8:
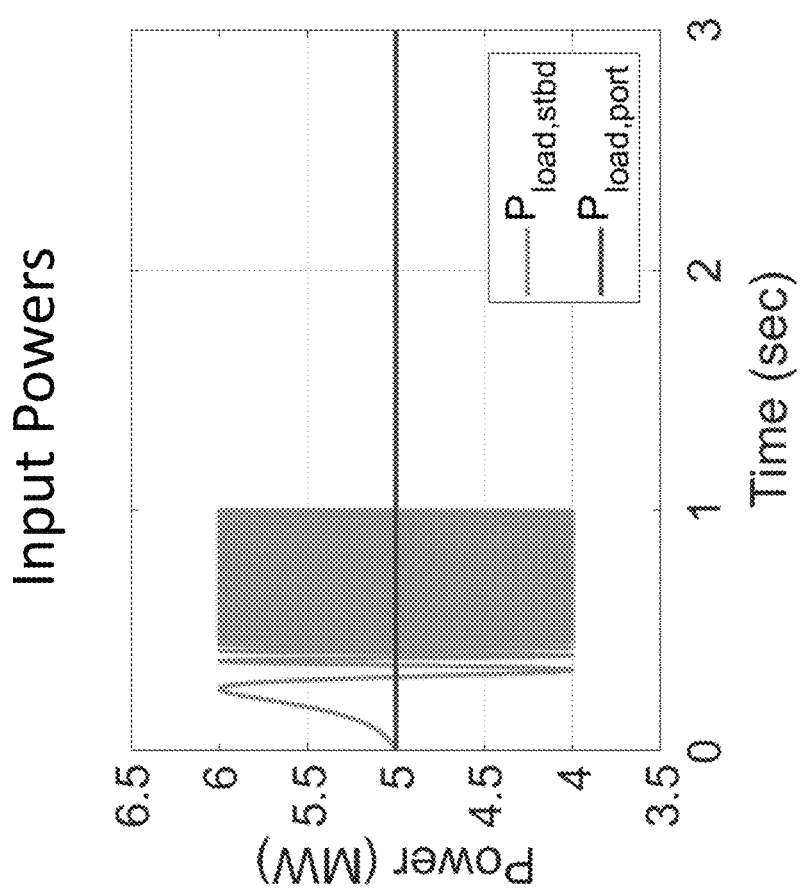
FIG. 8 is a graph of constant power load profiles for chirp testing.
Figure 9:
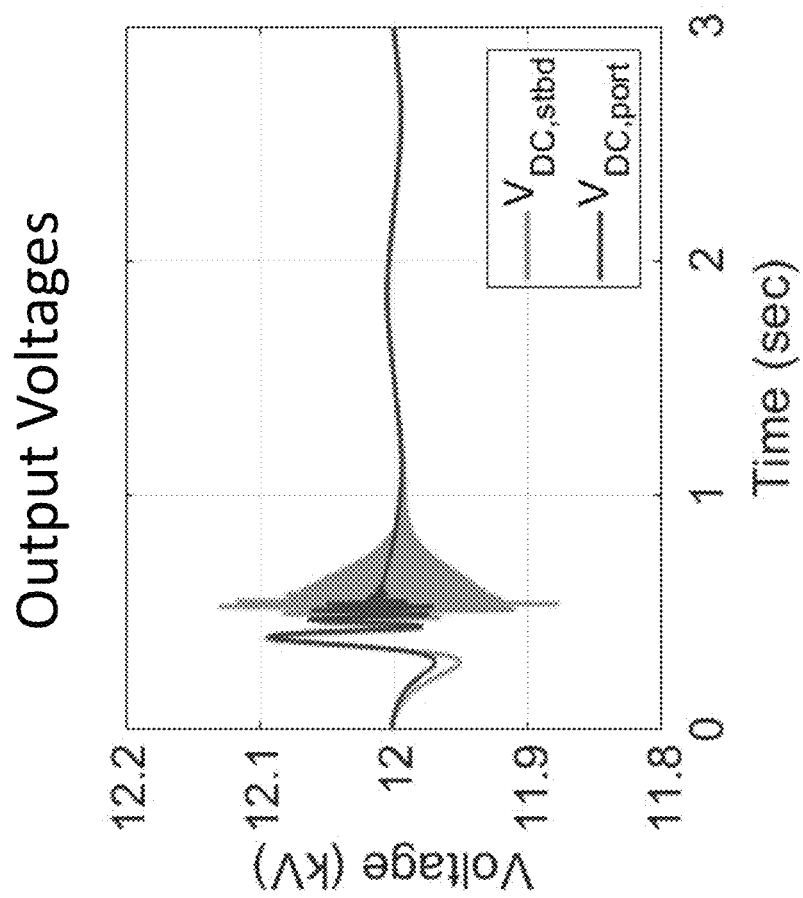
FIG. 9 is a graph of DC bus voltage responses with a permanent magnet synchronous machine (PMSM).
Figure 10:
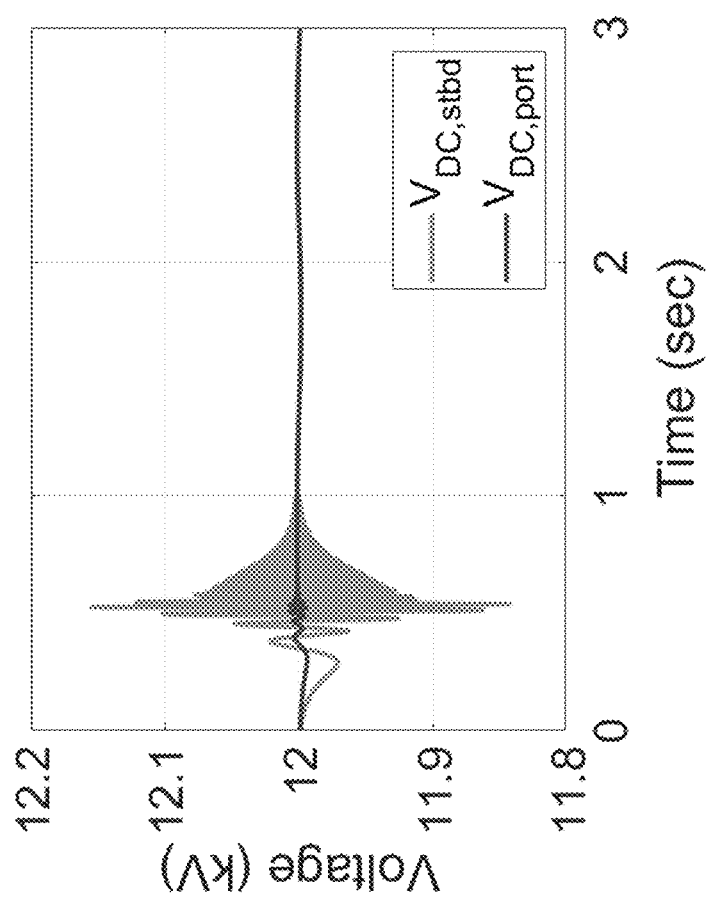
FIG. 10 is a graph of DC bus voltage responses with a wound rotor synchronous machine (WRSM).

To find the frequency response using time-domain simulation, the average-value modeled system was brought to steady state with the outputs connected to 5 MW constant power loads. A log-sine power chirp was then applied to starboard side (abc) of the system, as shown in FIG. 8. The resulting changes to the DC bus voltages on both the starboard (abc) and port (xyz) sides of the system are shown in FIG. 9 for the PMSM and FIG. 10 for the WRSM. For the PMSM, there is a high degree of correlation at low frequencies in the voltage variation. At higher frequencies, there is less variation on the other side of the machine. For the WRSM, the effects of the disturbance on the opposite side of the machine for both low and high frequencies have been greatly mitigated. This is because of the control loop that maintains a constant field flux, $\lambda_{fd}'$, in the generator.

Figure 11:
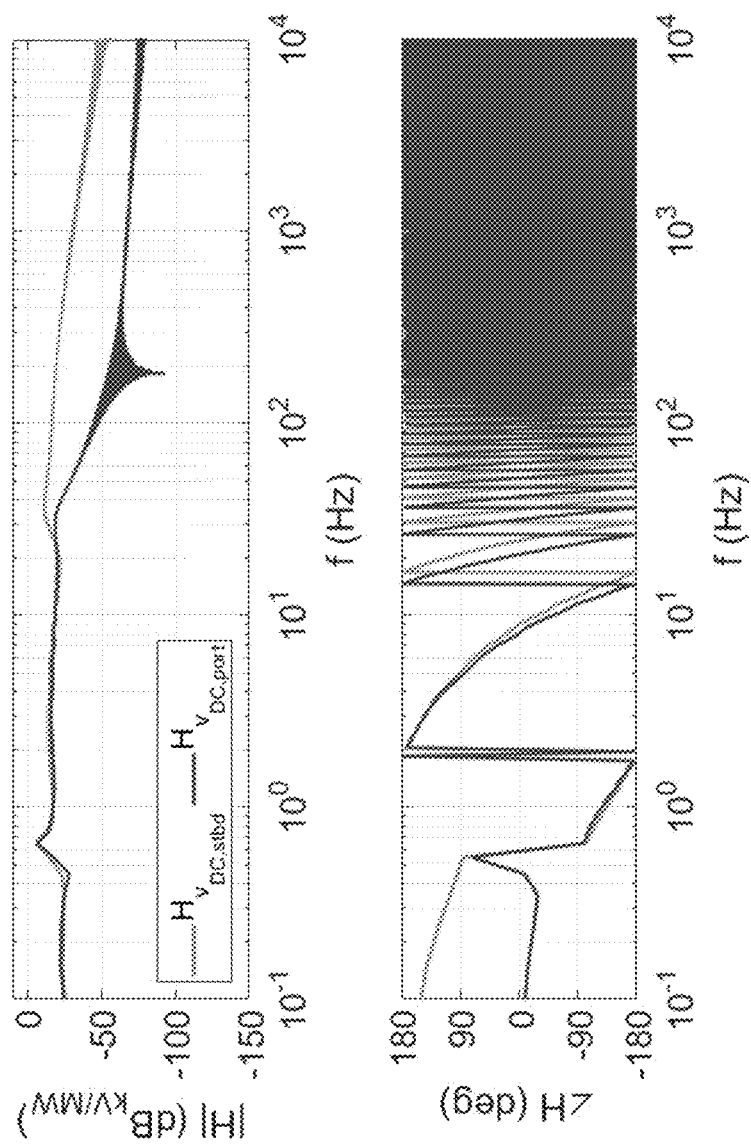
FIG. 11 is a graph of the transfer function between the starboard load and bus voltages for the PMSM.
Figure 12:
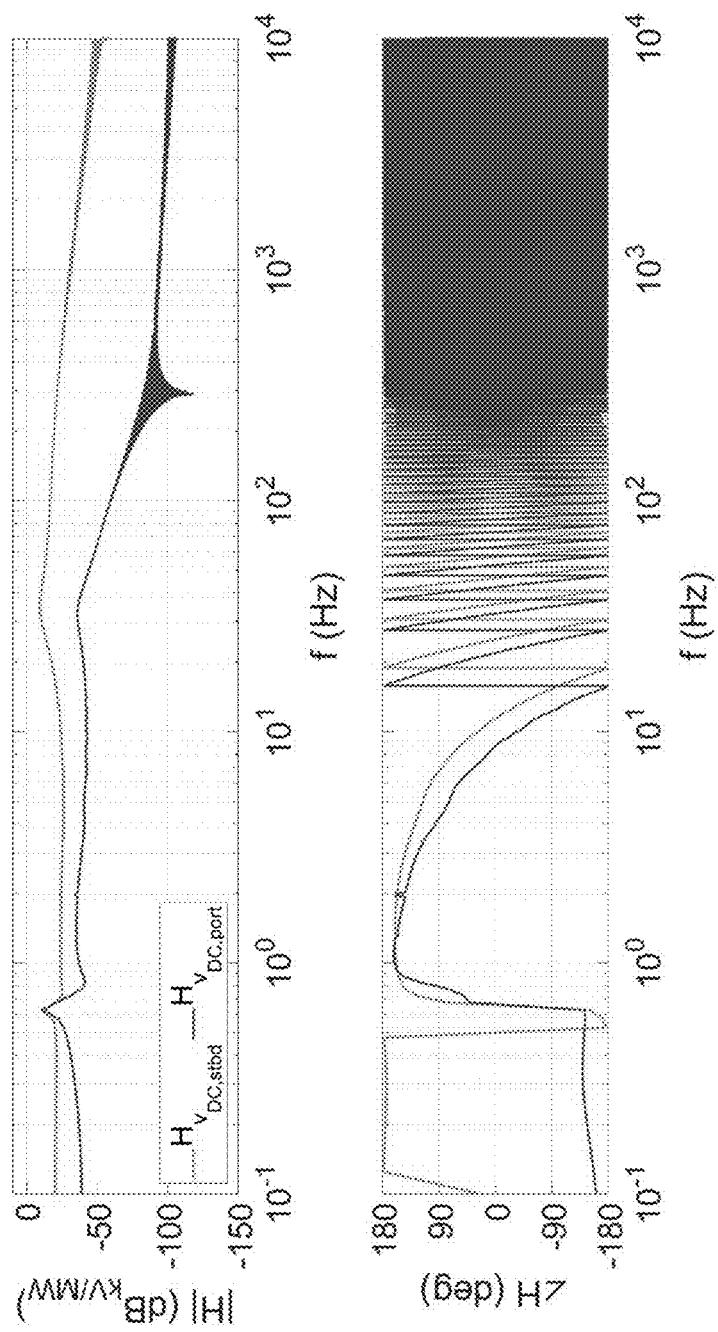
FIG. 12 is a graph of the transfer function between the starboard load and bus voltages for the WRSM.

In the frequency domain, these differences become more pronounced. The transfer function between load power and bus voltages for the PMSM is shown in FIG. 11. The transfer function for the WRSM is shown in FIG. 12. In the case of the PMSM, the voltages are tightly coupled at lower frequencies. However, once the frequency rises above 30 Hz, the voltage on the opposite (port) side of the machine is significantly attenuated. Additionally, there is a slight resonance in the system at 0.6 Hz. In the case of the WRSM, there is significant attenuation in the voltage variation on the opposite side of the machine at all frequencies.

The present invention has been described as excitation control of dual-wound machines for coupling mitigation. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A dual-wound machine, comprising a wound-rotor dual-wound generator supplying power to two separate powered zones having unbalanced loads, wherein the generator comprises a wound rotor having a field winding producing a magnetic field, a stator having two sets of collocated phase windings each set supplying power to a separate powered zone, and a field control having a feedback loop that controls the excitation voltage applied to the field winding, and thereby the magnetic field produced by the rotor, to mitigate dynamic coupling between the two sets of collocated phase windings due to a power disturbance of an unbalanced load in one of the two separate powered zones when supplying power to the two separate powered zones.

2. The dual-wound machine of claim 1, wherein the feedback loop maintains a constant field flux in the generator.

3. The dual-wound machine of claim 1, wherein the feedback loop regulates a field flux in the generator in response to a generator speed.

* * * * *